(12) United States Patent
Campagnolo

(10) Patent No.: US 6,364,799 B1
(45) Date of Patent: Apr. 2, 2002

(54) QUICK-CONNECTION LINK, FOR A BICYCLE CHAIN

(75) Inventor: Valentino Campagnolo, Vicenza (IT)

(73) Assignee: Campagnolo SRL, Vicenza (IT)

( * ) Notice: Subject to any disclaimer, the term of this patent is extended or adjusted under 35 U.S.C. 154(b) by 0 days.

(21) Appl. No.: 09/526,060

(22) Filed: Mar. 15, 2000

(30) Foreign Application Priority Data

Apr. 13, 1999 (IT) ......................................... TO99A0285

(51) Int. Cl.[7] ............................................... F16G 13/02
(52) U.S. Cl. ........................ 474/206; 474/227; 474/228; 474/207
(58) Field of Search ................................ 474/212, 213, 474/214, 215, 207, 206, 225, 226, 227, 228, 234, 210, 78, 230, 231, 233; 59/84, 78, 9, 85, 900, 5

(56) References Cited

U.S. PATENT DOCUMENTS

| | | | | | |
|---|---|---|---|---|---|
| 4,123,947 A | * | 11/1978 | Smith et al. | ................. | 474/207 |
| 4,143,512 A | * | 3/1979 | Templin | .................. | 474/277 X |
| 4,250,764 A | * | 2/1981 | Grant | .......................... | 474/207 |
| 4,271,663 A | * | 6/1981 | Templin et al. | ................. | 59/84 |
| 4,355,502 A | * | 10/1982 | Sheldon | .................. | 474/207 X |
| 4,636,181 A | * | 1/1987 | Savolainen et al. | ......... | 474/207 |
| 5,098,349 A | * | 3/1992 | Wu | ........................ | 474/226 X |
| 5,461,852 A | * | 10/1995 | Nagamatsu | ............. | 474/207 X |

* cited by examiner

Primary Examiner—David A. Bucci
Assistant Examiner—Marcus Charles
(74) Attorney, Agent, or Firm—Sughrue Mion, PLLC

(57) ABSTRACT

A quick-connection link for a bicycle chain, comprises a pair of plates, a pair of tubular articulating pins secured to one of the aforementioned plates, and a pair of quick-coupling pegs that are received in tubular pins and are gripped inside them to prevent separation of the other plate from the tubular articulating pins.

8 Claims, 4 Drawing Sheets

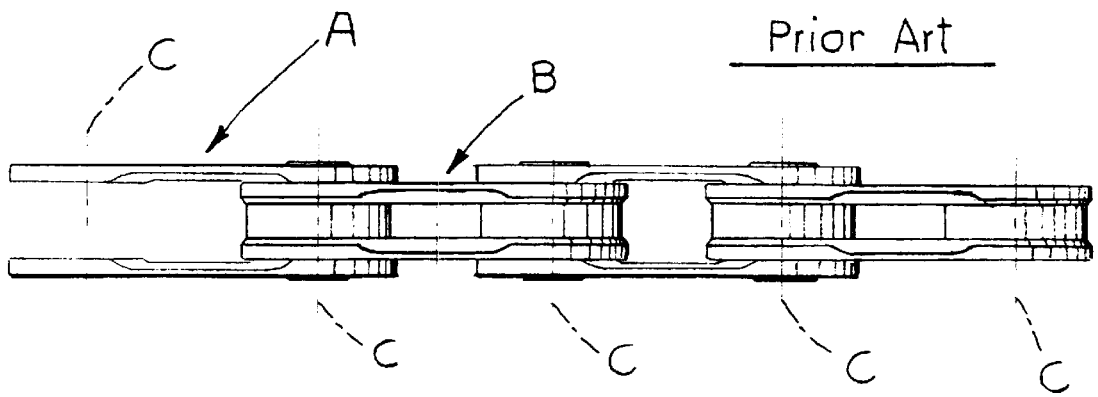
Fig_1
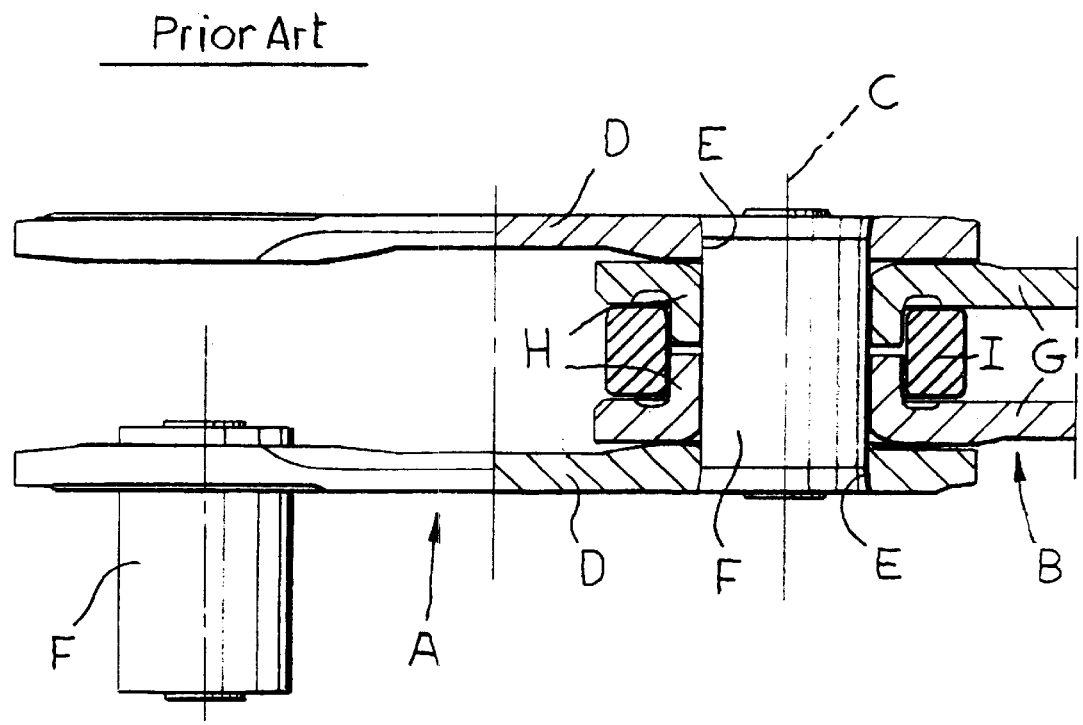
Fig_2

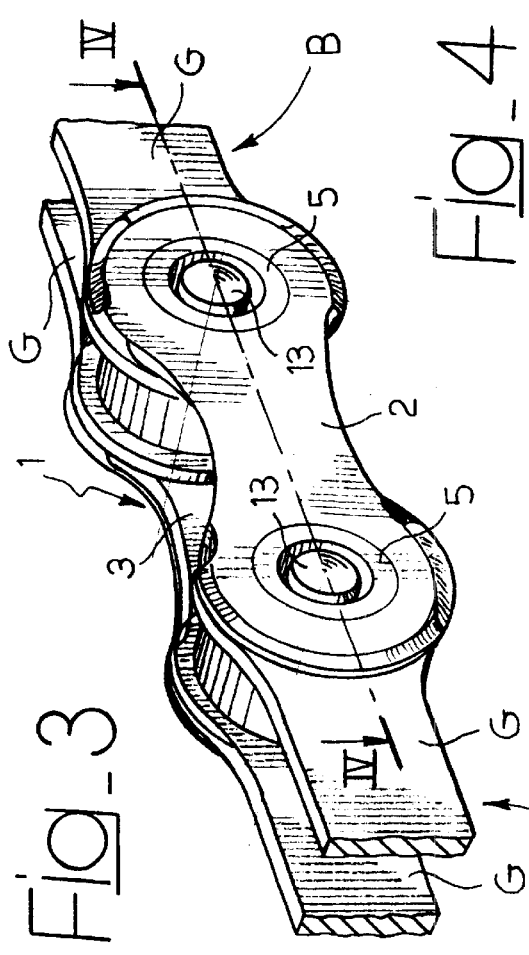
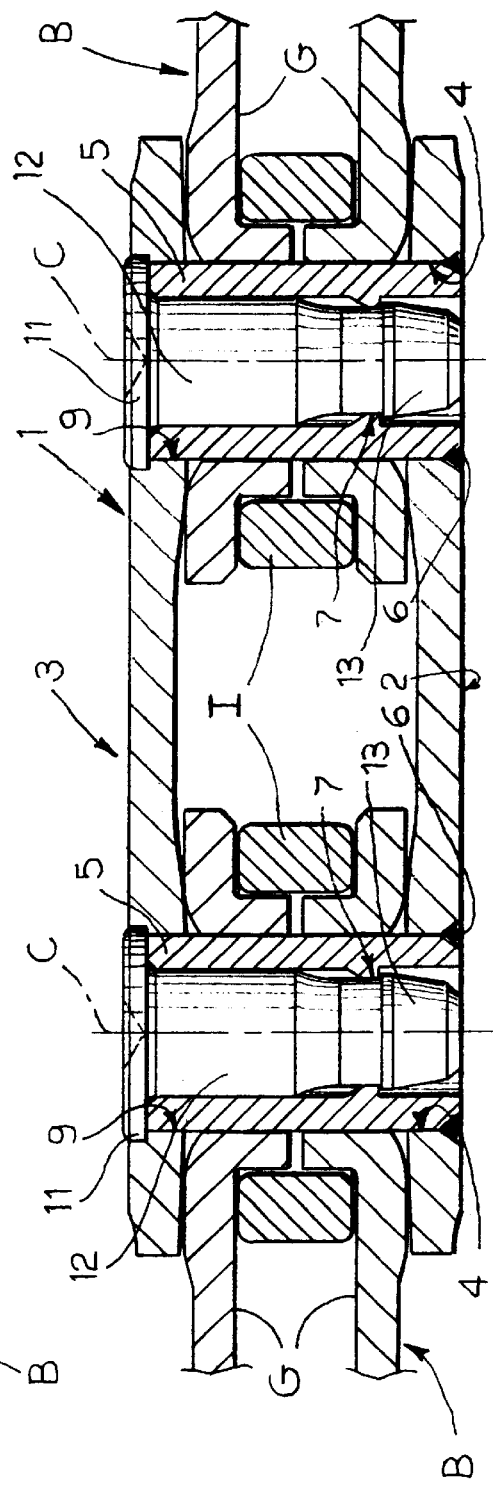

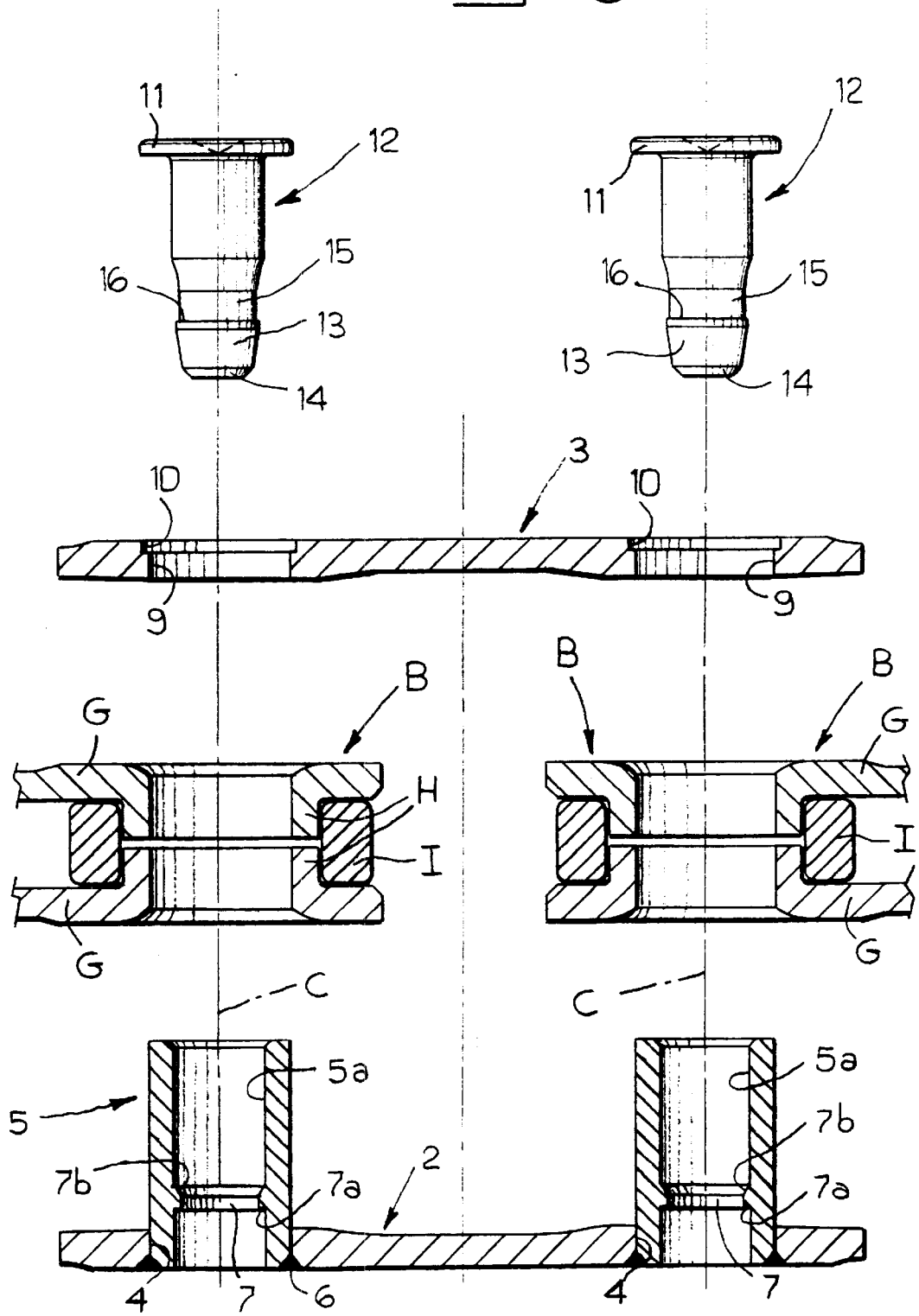

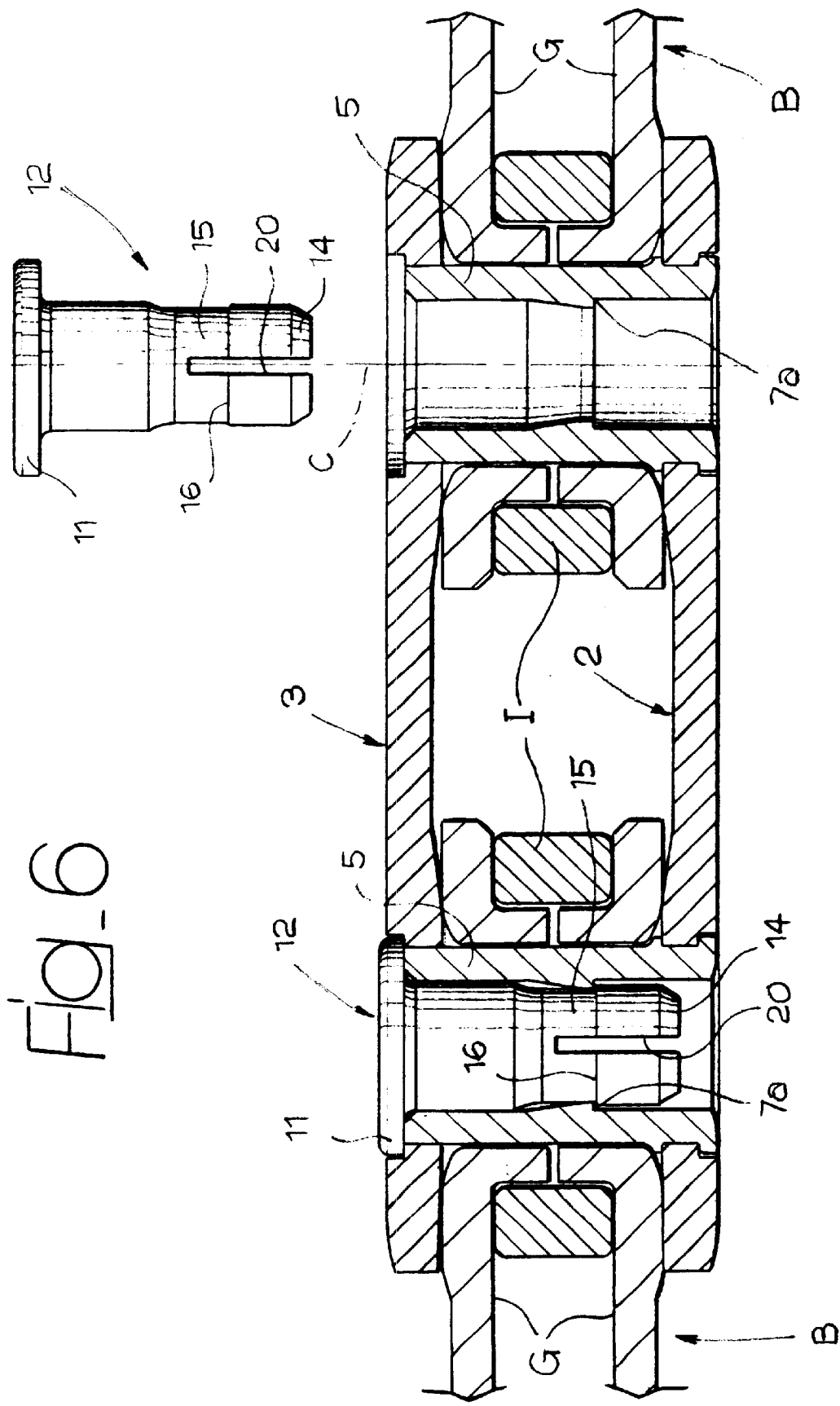
Fig_6

QUICK-CONNECTION LINK, FOR A BICYCLE CHAIN

BACKGROUND OF THE INVENTION

The present invention relates to bicycle chains, of the type comprising a large number of chain links hinged together and consisting of pairs of elongated plates, parallel to each other and a certain distance apart, arranged alternately externally and internally, so as to define outer links, comprising outer chain plates, alternating with inner links, comprising inner chain plates, each outer link being hinged on opposite sides to two adjacent inner links by means of pins secured at their ends to the plates of the outer link.

A bicycle chain according to the known technology is illustrated in FIGS. 1 and 2 of the appended drawings. FIG. 1 shows a portion of the chain, comprising outer links A alternating with inner links B, mutually hinged about axes of articulation C. FIG. 2 shows partially in section and on an enlarged scale, the connection between an outer link A and an inner link B. The outer link A is made up of two outer plates D. Corresponding to each axis of articulation C, the two outer plates D have coaxial holes E within which the ends of an articulating pin F are secured with an interference fit. Pin F supports, with articulation, two inner plates G constituting an inner link B. The inner plates G have coaxial portions H in the form of bushes, on which a roller I is mounted, free to rotate. A bicycle chain is arranged as a closed loop and engages one of the gears associated with the crank axle of the bicycle (chain ring) and one of the pinions associated with the rear wheel of the bicycle. When we wish to remove the chain, for example for the purpose of adding or removing chain links, or for lubricating the chain, it is necessary for one of the pins F to be removed partially, as shown in the left part of FIG. 2 of the appended drawings. As a rule, the pin is not removed completely, but remains secured and projecting from one of the outer plates D, as shown in FIG. 2. When it is necessary to reassemble the chain, an inner chain-link is arranged between the two plates D and then connected to them with articulation, returning pin F to the original position and fitting the said pin with interference in the respective hole provided in plate D shown at the top in FIG. 2.

Recent developments in the design of the pinion assembly associated with the rear wheel of the bicycle have led to the production of assemblies with an ever larger number of pinions. In order to minimize the axial dimensions of the assembly, the pinions are being made thinner and thinner, and closer together, which in consequence makes it necessary to manufacture drive chains that are narrower and narrower, so as to ensure that when the chain is in engagement on a pinion it does not interfere on one side with the adjacent pinion. It is also essential that with the chain in its assembled state, the articulating pins of the chain should have zero or at any rate very reduced projection relative to the outer plates of the chain. Therefore, when carrying out the operation of dismantling and then reassembly of the chain, care must be taken that pin F shown on the left in FIG. 2 is put back in a correctly assembled state, where it has minimum projection to the outside of the outer plates of the chain. Proper execution of this operation can prove difficult when the chain has a very small transverse dimension.

It should also be pointed out that special links (or "false links") for bicycle chains have already been proposed, and these have the purpose of permitting quick and correct assembly of the chain (cf. U.S. Pat. No. 5,362,282).

SUMMARY OF THE INVENTION

The purpose of the present invention is to provide a special link for bicycle chains, which permits easy and quick execution of the operation of assembly of the chain, ensuring correct execution of the assembly operation, even with chains with a very small transverse dimension, and with relatively simple and inexpensive means.

With a view to achieving this aim, the object of the invention is a special quick-connection link for a bicycle chain of the type indicated above, characterized in that the said special link comprises a pair of outer plates, the first of the said outer plates being equipped, to correspond to at least one of the two articulations of the link, with a tubular articulating pin, having a first end secured to the said first outer plate, and able to receive on itself and support, in hinged fashion, an inner chain-link, with the end of the tubular pin opposite the said first end that projects beyond the said inner link and is received in a hole in the second outer plate, the said special link comprising in addition a locking element that can engage on the said tubular pin, to prevent separation of the said second outer plate from the tubular pin.

In a preferred embodiment, the special link according to the invention is provided with the aforesaid tubular pin and with the respective locking element corresponding to each of its two articulations.

Still in the case of the aforementioned preferred embodiment, the locking element is a quick-coupling peg, which goes into the respective tubular pin and which is provided with a head to prevent unthreading of the second outer plate from the tubular pin, the said quick-coupling peg and the said tubular pin being provided with means for mutual engagement for axial restraint of the peg in the tubular pin.

In one example of application, the aforesaid means for mutual engagement comprise a circumferential rib projecting from the inside surface of the tubular pin and an annular surface for stopping the peg, defined by a middle portion of the peg with reduced diameter.

Again in the case of the aforesaid example of application, the peg has a conical point capable of interacting with a bevelled edge of the aforesaid circumferential rib to facilitate the engagement of an end portion of the peg in addition to the aforesaid rib.

On account of the aforementioned characteristics, once the chain has been dismantled in the conventional way, the chain can be assembled by replacing an outer link of the chain with a special link according to the invention.

In the case of the example of embodiment cited above, the mutual engagement of the stop peg in the respective tubular pin is irreversible, so that once the special link is fitted, the chain can be dismantled again in the conventional manner corresponding to a conventional link and then refitted with the addition of a new special link.

Of course, it is possible to use any number of special links according to the invention in one and the same chain and it is indeed possible to envisage a chain comprised solely of special links according to the present invention.

BRIEF DESCRIPTION OF THE DRAWINGS

Further characteristics and advantages of the invention will be seen from the description that follows, with reference to the appended drawings, which are supplied purely as a non-limitative example, in which:

FIG. 1 is a view of a portion of a chain according to the known technology,

FIG. 2 is a sectional view on an enlarged scale, of a detail of the chain in FIG. 1 according to the known technology, in the dismantled state, FIG. 3 is a perspective view of the special link according to the present invention, FIG. 4 is a sectional view on an enlarged scale on line IV—IV of FIG. 3, FIG. 5 is an exploded sectional view of a link according to the invention, and FIG. 6 shows a variant of FIG. 4.

DETAILED DESCRIPTION OF THE INVENTION

Referring to FIGS. 3–5, number 1 indicates the whole of a special quick-connection link for a bicycle chain, which can also be used for example in a chain of the type shown in FIGS. 1 and 2. Link 1 replaces one of the outer links A of the chain and joins together, in articulated fashion, two inner links B each consisting of a pair of inner plates G with the respective rollers I. The special link 1 comprises a pair of outer plates, namely a first outer plate 2 and a second outer plate 3.

Referring in particular to FIGS. 4 and 5, the first outer plate 2 has, corresponding to the two articulation axes C, two circular holes 4 into each of which is fitted one end of a tubular articulating pin 5, made of a metallic material, for example steel, like plates 2 and 3. The said end of each tubular pin 5 is secured to the first plate 2 by means of a weld 6. Each tubular articulating pin 5 has an internal cylindrical surface 5a (FIG. 5) from which a circumferential rib 7 projects, forming an annular shoulder 7a perpendicular to axis C on the side facing plate 2, and an annular chamfer 7b on the opposite side.

Each tubular articulating pin 5 is able to receive, and support in articulated fashion, the two bushes H made at one end of plate G forming a corresponding inner link B.

As can be seen in FIG. 4, with the two inner links B mounted on two tubular articulating pins 5, each tubular pin 5 has an end opposite to that welded to plate 2 that projects beyond the respective inner link B and which is received in a circular hole 9 made at the corresponding end of the second outer plate 3. Each hole 9 has a portion with enlarged diameter 10 that receives the head 11 of a peg 12. Each peg 12 has a conical end portion 13 ending with a bevelled edge 14, as well as an intermediate portion 15 of reduced diameter that defines an annular shoulder 16 perpendicular to the axis of the peg (see FIG. 5). Each peg 12 is received in the cylindrical hole 5a of a respective tubular articulating pin 5 and is retained axially thereon by engagement with the surface of shoulder 16 of the peg beyond the circumferential rib 7, which carries the peg in the condition shown in FIG. 4. Engagement of the front chamfer 14 and of the conical end portion 13 of the peg above the bevelled edge 7b of rib 7 facilitates the operation of insertion of the said peg. FIG. 4 shows a variant in which each peg 12 has a front slot 20, so that in this case snapping of the peg within the tubular pin 5 is obtained by deformation of the peg, rather than by deformation, of the tubular wall of pin 5 as in the case of FIG. 6.

The link described above makes it possible to execute assembly of the chain with quick and simple operations, guaranteeing that in the assembled state there are no projections on the two sides of the link exceeding the predetermined values. In the example shown, the engagement of each peg 12 on the respective rib 7 is irreversible, so that once assembled the chain can be dismantled again in the traditional way, by removing one of the articulating pins of one of the conventional links. Subsequent re-assembly of the chain will involve the addition of a further special link of the type described above, for the purpose of ensuring that the assembly operation is executed quickly and correctly.

Of course, without prejudice to the principle of the invention, the details of construction and the forms of realization can vary widely relative to what has been described and illustrated purely as an example, though without leaving the scope of the present invention. For example, the tubular articulating pin 5 with the respective locking peg 12 might be provided on just one of the two articulations of the link. Furthermore, the locking element of the second plate 3 might not be a peg, or might in any case be much shorter than peg 12 that was illustrated as an example.

What is claimed is:

1. A quick-connection link, for a bicycle chain that comprises a large number of chain links hinged together and comprised of pairs of elongated plates parallel to each other and some distance apart, arranged alternatively inside and outside one another, so as to define outer links, comprising outer chain plates alternatively with inner links, comprising inner chain plates, each outer link being articulated on opposite sides to two adjacent inner links by means of pins secured at their ends to the plates of the outer link, at least one of the outer chain-links being a special link which can be used for quick assembly of the chain, wherein the said quick-connection link comprises a pair of outer plates, the first of the said outer plates being equipped, to correspond to at least one of the two articulations of link, with a tubular articulating pin, possessing a first end non-removably secured to the said first outer plate, and able to receive on itself and support, in articulated fashion, an inner chain-link, with the end of the tubular pin opposite to the said first end that projects beyond the said inner link and inserted in a hole in the second outer plate, the said quick-connection link comprising in addition a locking element inserted and engageable within the said tubular pin, to prevent separation of the said second outer plate from the tubular pin.

2. A link according to claim 1, wherein the said locking element is a quick-coupling peg, which is received in the said tubular pin and which is provided with a head to prevent separation of the said second outer plate from the tubular pin, the said quick-coupling peg and the said tubular pin being provided with means for mutual engagement for axial retention of peg in tubular pin.

3. A link according to claim 1, wherein the said means for mutual engagement comprise a circumferential rib projecting from the inside surface of tubular pin, and an annular locking surface of peg defined an intermediate portion with reduced diameter of peg.

4. A link according to claim 1, wherein it is provided with the aforementioned tubular pin and with respective locking element to correspond to each of its two articulations.

5. A link according to claim 1, wherein tubular pin is welded to the first plate of the link.

6. A link according to claim 3, wherein the peg has a conical point that is able to interact with a bevelled edge of the aforementioned circumferential rib to facilitate engagement of a portion of end of the said peg beyond rib.

7. A link according to claim 6, wherein said peg has a front slot for easier engagement of the peg within the respective tubular pin.

8. A bicycle chain comprising a plurality of outer links alternating with a plurality of inner links mutually hinged about axis of articulation, one of said outer links comprising a quick-connection link, wherein the said quick-connection link comprises a pair of outer plates, the first of the said outer plates being equipped, to correspond to at least one of the two articulations of link, with a tubular articulating pin, possessing a first end non-removably secured to the said first outer plate, and able to receive on itself and support, in articulated fashion, an inner chain-link, with the end of the tubular pin opposite to the said first end that projects beyond the said inner link and inserted in a hole in the second outer plate, the said quick-connection link comprising in addition a locking element inserted and engageable within the said tubular pin, to prevent separation of the said second outer plate from the tubular pin.

* * * * *